(12) United States Patent
Zhu et al.

(10) Patent No.: US 10,401,918 B2
(45) Date of Patent: Sep. 3, 2019

(54) DISPLAY DEVICE

(71) Applicants: BOE TECHNOLOGY GROUP CO., LTD., Beijing (CN); Beijing BOE Display Technology Co., Ltd., Beijing (CN)

(72) Inventors: Kunpeng Zhu, Beijing (CN); Inho Park, Beijing (CN); Zhanchang Bu, Beijing (CN); Ming Chen, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/745,584

(22) PCT Filed: May 12, 2017

(86) PCT No.: PCT/CN2017/084153
§ 371 (c)(1),
(2) Date: Jan. 17, 2018

(87) PCT Pub. No.: WO2017/206699
PCT Pub. Date: Dec. 7, 2017

(65) Prior Publication Data
US 2018/0232014 A1  Aug. 16, 2018

(30) Foreign Application Priority Data
May 31, 2016 (CN) .................. 2016 2 0520517 U (51) Int. Cl.
*H04N 5/225* (2006.01)
*G06F 1/16* (2006.01)
*E05D 3/02* (2006.01)

(52) U.S. Cl.
CPC ............ *G06F 1/1686* (2013.01); *E05D 3/02* (2013.01); *G06F 1/1616* (2013.01);
(Continued)

(58) Field of Classification Search
CPC .... G06F 1/1686; G06F 1/1616; G06F 1/1681; G06F 1/16; H04N 5/2252; H04N 5/2257; H04N 5/2253; E05D 3/02; E05Y 2900/606
See application file for complete search history.

(56) References Cited

U.S. PATENT DOCUMENTS 6,118,653 A * 9/2000 Kim .................. G06F 1/1616
312/223.1
7,217,044 B1  5/2007 Marks, Jr. et al.
(Continued)

FOREIGN PATENT DOCUMENTS

CN  2745106 Y  12/2005
CN  204408431 U  6/2015
(Continued)

OTHER PUBLICATIONS

International Search Report & English Translation of Box V of the Written Opinion, for PCT Patent Application No. PCT/CN2017/084153, dated Aug. 7, 2017, 18 pages.

*Primary Examiner* — Hung H Lam
(74) *Attorney, Agent, or Firm* — Kinney & Lange, P.A.

(57) ABSTRACT

Embodiments of the present disclosure relate to the field of electronics and provide a display device including a housing and a camera movably connected to the housing through a connecting part. The camera is movable between a position where it is affixed onto the housing and a position where it extends beyond the periphery of the housing.

13 Claims, 7 Drawing Sheets

(52) U.S. Cl.
CPC ......... *G06F 1/1681* (2013.01); *H04N 5/2252* (2013.01); *H04N 5/2253* (2013.01); *H04N 5/2257* (2013.01); *E05Y 2900/606* (2013.01)

(56) References Cited

U.S. PATENT DOCUMENTS

| | | | | |
|---|---|---|---|---|
| 7,435,018 | B2 * | 10/2008 | Huang | G03B 17/04 |
| | | | | 348/373 |
| D793,465 | S * | 8/2017 | Kong | D14/439 |
| 2007/0253703 | A1 * | 11/2007 | Tsai | G03B 17/02 |
| | | | | 396/429 |
| 2009/0293656 | A1 * | 12/2009 | Liu | H04N 5/2252 |
| | | | | 74/110 |
| 2012/0236195 | A1 * | 9/2012 | Chang | G06F 1/1686 |
| | | | | 348/333.06 |

FOREIGN PATENT DOCUMENTS

| | | |
|---|---|---|
| CN | 105007401 A | 10/2015 |
| CN | 204887171 U | 12/2015 |
| CN | 205721537 U | 11/2016 |

* cited by examiner

DISPLAY DEVICE

CROSS-REFERENCE TO RELATED APPLICATION

This application is a Section 371 National Stage Application of International Application No. PCT/CN2017/084153, filed on May 12, 2017, entitled "DISPLAY DEVICE", which claims priority to Chinese Application No. 201620520517.8, filed on May 31, 2016, incorporated herein by reference in its entirety.

BACKGROUND OF THE INVENTION

Field of the Invention

The present disclosure relates to the field of electronic technology, and in particular to a display device.

Description of the Related Art

Recently, as people are demanding more and more to the display device in terms of miniaturization, lightweight and portability while using display devices to help them work or enrich their lives. Notebook computers, tablet computers, ultra-books, smartphones and the like require miniaturization and thinning with its own performance being ensured, thereby increasing the display area and reducing other unnecessary size and weight.

A conventional display device with a camera, such as a notebook computer, has a camera usually disposed in a blank area between a display screen and a bezel, and the blank area of the display device becomes too large, thereby increasing the overall size of the display device.

SUMMARY OF THE INVENTION

The embodiments of the present disclosure provide a display device, wherein the display device comprises a housing and a camera movably connected to the housing through a connecting part, and the camera is movable between a position where the camera is affixed onto the housing and a position where the camera extends beyond the periphery of the housing.

In an embodiment of the present disclosure, the housing comprises a front bezel and a rear shell, and the camera is disposed on a side of the rear shell facing away from the front bezel.

In an embodiment of the present disclosure, the camera is arranged at a middle position on an upper part of the rear shell.

In an embodiment of the present disclosure, the connecting part comprises a hinge shaft and a hinge sleeve fitted with the hinge shaft; and the hinge sleeve is disposed on the rear shell and the hinge shaft is disposed on the camera, or the hinge shaft is disposed on the rear shell and the hinge sleeve is disposed on the camera.

In an embodiment of the present disclosure, a groove for receiving the camera is provided on the rear shell, and the camera is received in the groove when the camera is moved to the position where the camera is affixed onto the rear shell of the housing.

In an embodiment of the present disclosure, the connecting part comprises a telescopic rod, one fixed end of which is connected to the rear shell and a telescopic end of which is connected to the camera.

In an embodiment of the present disclosure, the telescopic rod comprises a plurality of sliding bushes fitted over one another, and a stopper is arranged between two adjacent said sliding bushes and comprises a stopping protrusion provided on an inner surface of one of the two adjacent sliding bushes and a stopping groove provided on an outer surface of the other of the two adjacent sliding bushes.

In an embodiment of the present disclosure, cross sections of the plurality of sliding bushes fitted over one another are circular or oval or rectangular, and the plurality of the sliding bushes are fitted over one another in an outside to inside order.

In an embodiment of the present disclosure, the telescopic end of the telescopic rod is connected with the camera through a universal joint.

In an embodiment of the present disclosure, the connecting part comprises a guide rail and a guide block, the guide rail being fitted with and slidable relative to the guide block; and the guide rail is disposed on the rear shell, and the camera is disposed on the guide block; or the guide block is disposed on the rear shell, and the camera is disposed on the guide rail.

In an embodiment of the present disclosure, a protective cover is disposed on the rear shell to cover the connecting part and the camera.

BRIEF DESCRIPTION OF THE DRAWINGS

To describe the technical solutions of the embodiments of the present disclosure or in the prior art more clearly, the following contents briefly introduce the accompanying drawings required for describing the embodiments or the prior art. Apparently, the accompanying drawings in the following description are merely some exemplary embodiments. For those skilled in the art, other drawings may be obtained based on these accompanying drawings without any inventive effort.

DETAILED DESCRIPTION OF PREFERRED EMBODIMENTS

The technical solutions in the embodiments of the present disclosure will be clearly and completely described below with reference to the accompanying drawings. The described embodiments are only a part but not all of the embodiments of the present disclosure. All other embodiments obtained by those skilled in the art based on the embodiments of the present disclosure without inventive efforts shall fall within the protection scope of the present disclosure.

Figure 1:
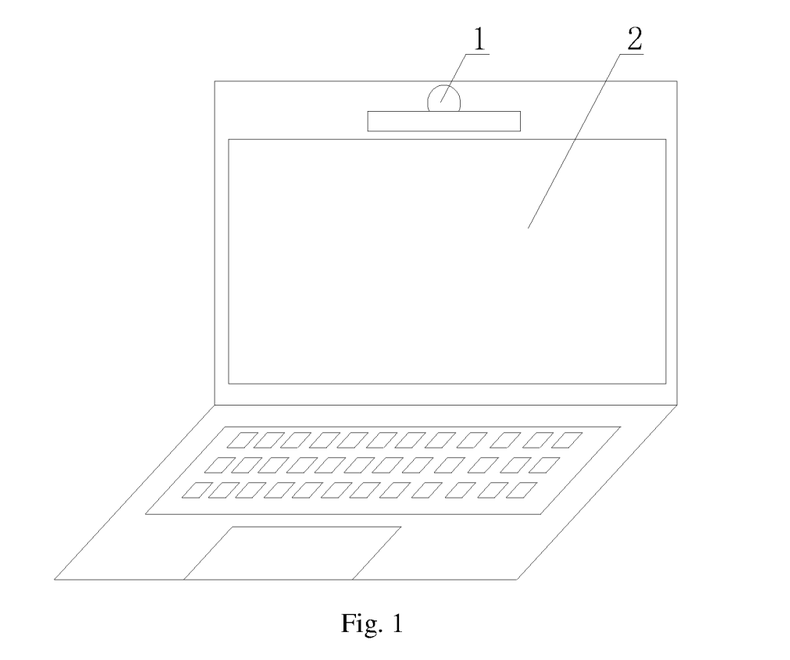
FIG. 1 is a schematic structural view of a display device in the related art.

A display device with a camera in the related art, such as a notebook computer, as shown in FIG. 1, has a camera 1 usually disposed in a blank area between a display screen 2 and a bezel, and the blank area of the display device becomes too large due to providing the camera 1, thereby increasing the overall size of the display device.

Figure 2:
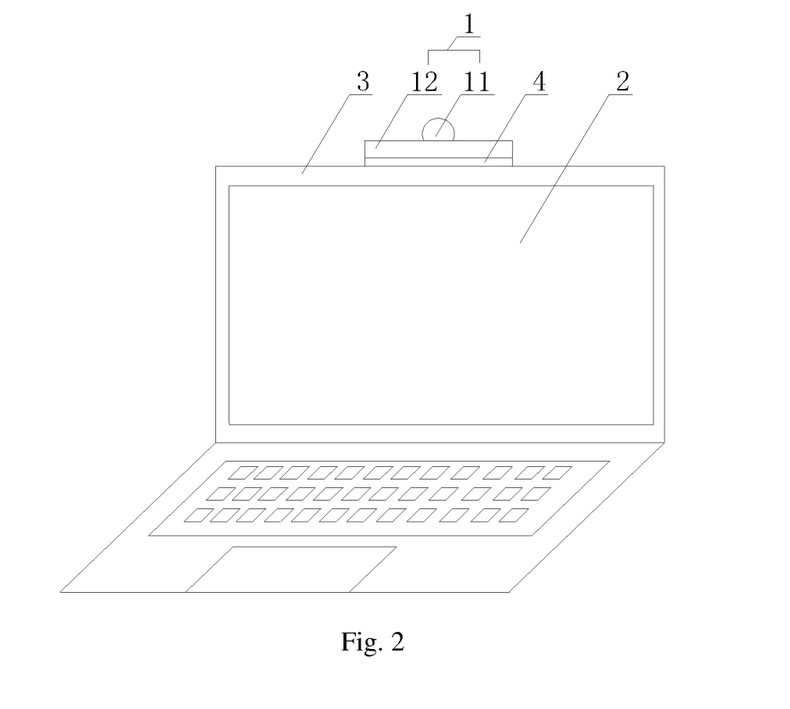
FIG. 2 is a schematic structural view of a display device of the present disclosure in which a camera is in a working state.

Embodiments of the present disclosure provide a display device, as shown in FIG. 2, comprising a housing 3 and a camera 1 movably connected to the housing 3 through a connecting part 4, and the camera 1 is capable of moving between a position where the camera 1 is affixed onto the housing 3 and a position where the camera 1 extends beyond the periphery of the housing 3.

The display device described in the present disclosure may be a portable display device as part of a notebook computer, a tablet computer, an ultrabook or a smartphone, or a display device capable of being mounted with a camera, such as a display of a television, for example. For the convenience of description, the following embodiments are described in detail taking a notebook computer as an example.

A display screen of the display device of the present disclosure may be a liquid crystal display screen, an OLED display screen or other types of display screen.

As shown in FIG. 2, the camera 1 generally includes a lens 11 and a circuit board 12 connected with the lens 11. The lens 11 is generally arranged to be integrated with the circuit board 12. In all the drawings of the present disclosure, the illustrated camera 1 includes a lens 11 and a circuit board 12 integrated with the lens 11. This disclosure does not relate to the internal structure design of the camera 1. Therefore, in this context, the lens 11 and the circuit board 12 integrated with the lens 11 will be collectively referred to as the camera 1 which will be described in detail.

Figure 3:
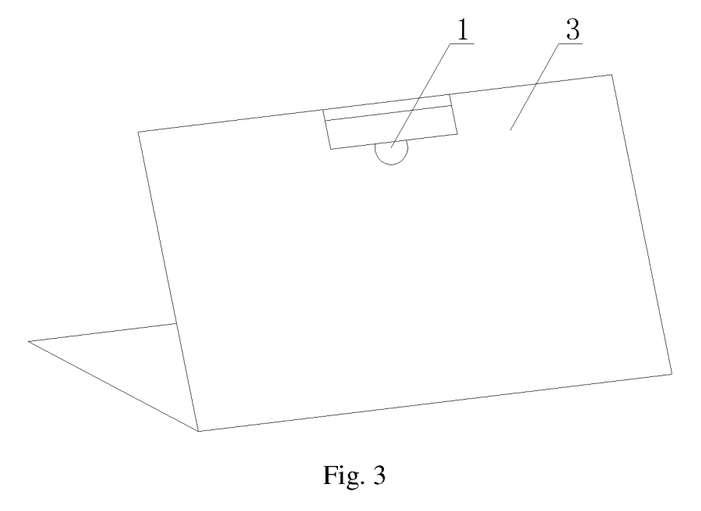
FIG. 3 is a schematic structural view of a display device of the present disclosure in which a camera is in a non-working state.

The camera 1 may be capable of moving between a position where the camera 1 is affixed onto the housing 3 and a position where the camera 1 extends beyond the periphery of the housing 3 such that the camera 1 extends to a position beyond the housing 3 to enable the camera 1 to capture the user when the camera 1 is in a working state, as shown in FIG. 2 The camera 1 may be retracted and affixed to the housing 3 to prevent the camera 1 from being raised excessively and easily damaged by a collision, when the camera 1 is in a non-working state, as shown in FIG. 3.

The camera 1 extends beyond the periphery of the housing 3, for example, the camera 1 is mounted on an upper part of the housing 3 or on either side of the housing 3. In one embodiment of the present disclosure, the camera is mounted at a middle position on the upper part of the housing 3.

Considering that the camera 1 needs to capture the user facing a display screen 2 when it is in the working state, in one embodiment of the present disclosure, the camera 1 may be movably mounted at an intermediate position on an upper part on the back side of the housing 3 through the connecting part 4. Hereinafter, the camera 1 being movably mounted at a middle and upper position on the back side of the housing 3 through the connecting part 4 is described in detail as an example.

The extending and retracting of the camera 1 is performed through the connecting part 4. Here, the specific form of the connecting part 4 is not limited, as long as it may ensure that the camera 1 can extend beyond the housing 3 and shoot the user when the camera 1 is in the working state and the camera 1 can be retracted and affixed to the housing 3 when the camera 1 is in the non-working state.

According to the display device provided by the embodiment of the present disclosure, the camera is movably connected to the housing through the connecting part and the camera is movable between a position where the camera is affixed onto the housing and a position where the camera extends beyond the periphery of the housing. In this way, the camera does not need to occupy the blank area of the display module, which increases the display area of the display device.

Figure 4:
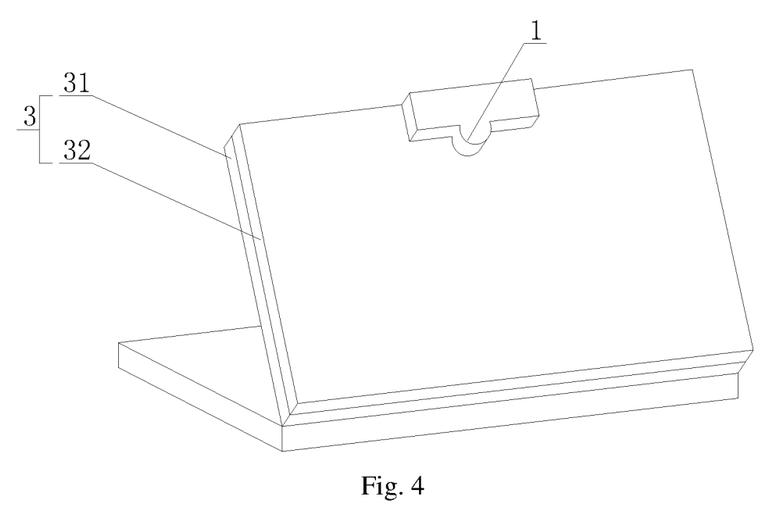
FIG. 4 is a schematic structural view of a display device of the present disclosure in which a camera is disposed on a rear shell of a housing.

In an embodiment of the present disclosure, as shown in FIG. 4, the housing 3 comprises a front bezel 31 and a rear shell 32, and the camera 1 is disposed on a side of the rear shell 32 facing away from the front bezel 31.

Therefore, when the camera 1 is in the non-working state, the camera 1 can be placed on a side of the rear shell 32 facing away from the front bezel 31, as shown in FIG. 4, without affecting the display effect of a light-emitting side of the display module, preventing that the camera 1 would otherwise be placed on the front bezel 31 when the camera 1 is in the non-working state and partially obstruct the display area of the display screen 2 which will affect use of the camera by the user.

The following is a detailed description of a specific connection manner in which the camera 1 is disposed on a side of the rear shell 32 facing away from the front bezel 31 and the camera 1 is capable of moving between a position where the camera 1 is affixed onto the housing 3 and a position where the camera 1 extends beyond the periphery of the housing 3.

Figure 5:
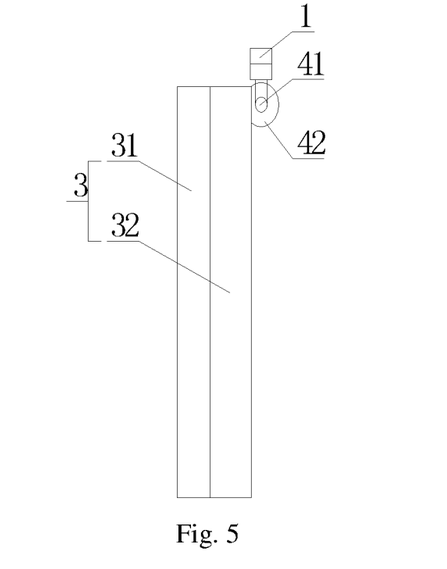
FIG. 5 is a schematic side view of a display device of the present disclosure in which connecting parts comprise a hinge shaft and a hinge sleeve, and a camera is in a working state.

In an embodiment of the present disclosure, as shown in FIG. 5, the connecting part 4 comprises a hinge shaft 41 and a hinge sleeve 42 fitted with the hinge shaft 41.The hinge sleeve 42 is disposed on the rear shell 32 and the hinge shaft 42 is disposed on the camera 1, or the hinge shaft 41 is disposed on the rear shell 32, and the hinge sleeve 42 is disposed on the camera 1.

Regardless of the case that the hinge sleeve 42 is disposed on the rear shell 32 and the hinge shaft 42 is disposed on the camera 1, or the case that the hinge shaft 41 is disposed on the rear shell 32 and the hinge sleeve 42 is disposed on the camera 1, it will enable a change in relative positions of the camera 1 and the rear shell 32.

Therefore, the camera 1 is movably connected to the rear shell 32 through the hinge shaft 41 and the hinge sleeve 42 fitted with each other. When being used, as shown in FIG. 5, the camera 1 is pivoted upward to extend beyond the upper edge of the rear shell 32, and is positioned parallel to the plane of the rear shell 32, so as to shoot the user at a front angle with the widest range.

Figure 6:
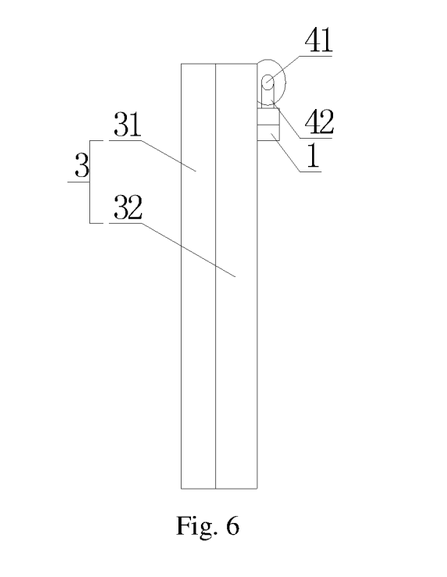
FIG. 6 is another schematic side view of a display device of the present disclosure in which connecting parts comprise a hinge shaft and a hinge sleeve, and a camera is in a non-working state.

When the camera 1 is in the non-working state, as shown in FIG. 6, the hinge shaft 41 rotates in the hinge sleeve 42 so that the camera 1 pivots downward and is affixed to the rear shell 32 without occupying the display area of the display screen 2, and thereby is avoided from protruding beyond the edge of the rear shell 32 and from being easily damaged by a collision.

Figure 7:
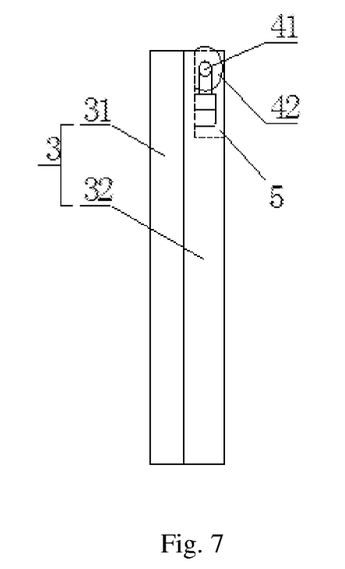
FIG. 7 is a schematic side view of a display device of the present disclosure provided with a groove.
Figure 8:
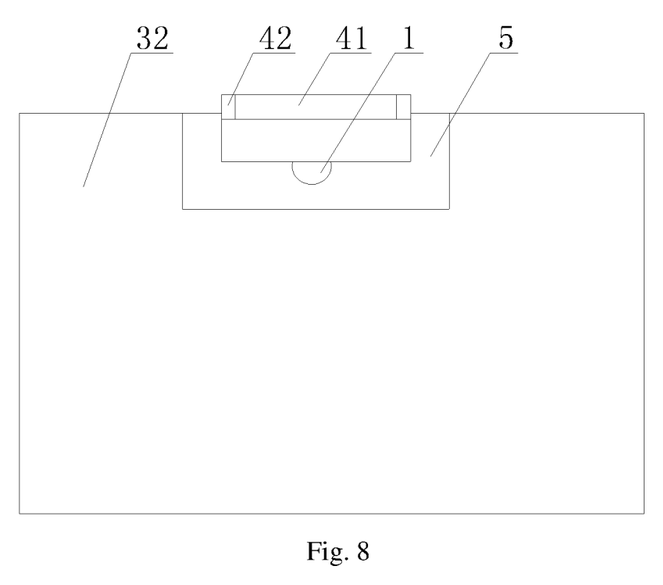
FIG. 8 is a top view of the display device provided with a groove shown in FIG. 7.

In an embodiment of the present disclosure, as shown in FIG. 7 and FIG. 8, a groove 5 for receiving the camera 1 is provided in the back shell 32 and the camera 1 is received in the groove 5 when the camera 1 is moved to the position where the camera 1 is affixed onto the rear shell 32.

Therefore, the groove 5 is disposed at the middle position of the upper edge of the rear shell 32, and is received in the groove 5 when the camera 1 moves to the position where the camera is affixed onto the rear shell 32. When the camera 1 is in the non-working state, the camera 1 is pivoted into the groove 5 and does not protrude beyond the surface of one side of the rear shell 32 facing away from the front bezel 31, preventing the camera 1 from being damaged by the collision when the camera 1 is retracted.

In an embodiment of the present disclosure, the shape of the groove 5 is set to be the same as the shape of the camera 1. When the camera 1 is received in the groove 5, the camera 1 is fitted in the groove 5 more closely, preventing the camera 1 from sliding out when the hinge shaft 41 is not tightly connected with the hinge sleeve 42. At the same time, the appearance of the notebook computer may also be aesthetically pleasing.

Figure 9:
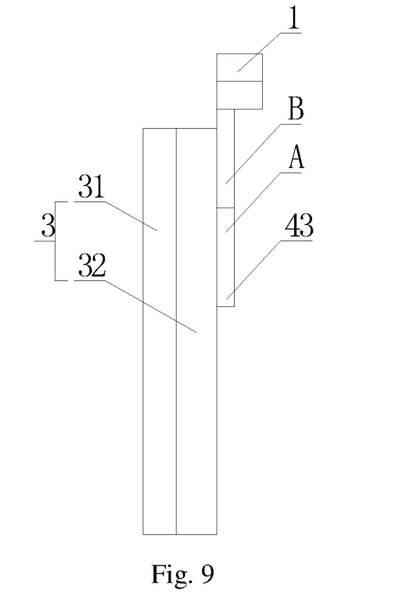
FIG. 9 is a schematic side view of a display device of the present disclosure in which a connecting part is a telescopic rod.
Figure 10:
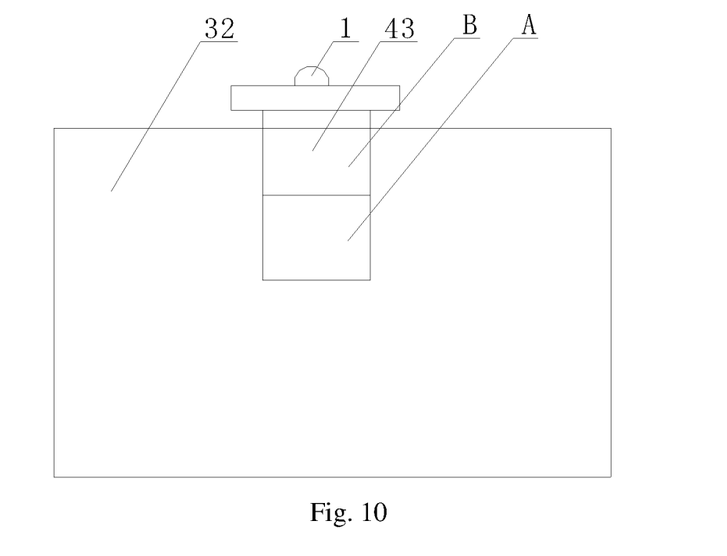
FIG. 10 is a schematic top view of a display device of the present disclosure in which a connecting part is a telescopic rod.

In one embodiment of the present disclosure, as shown in FIG. 9 and FIG. 10, the connecting part 4 comprises a telescopic rod 43, one fixed end A of which is connected to the rear shell 32 and a telescopic end B of which is connected to the camera 1. The fixed end A of the telescopic rod 43 is fixedly connected to the rear shell 32, and the telescopic end B of the telescopic rod 43 may approach the fixed end A or leave away from the fixed end A in the telescopic process.

Therefore, the camera 1 may be extended beyond the upper edge of the rear shell 32 through the telescopic rod 43 when the camera is in the working state. When being in the non-working state, the length of the telescopic rod 43 may be reduced, and the camera 1 is received in the middle part of the rear shell 32 to avoid bump at the edge.

Figure 11:
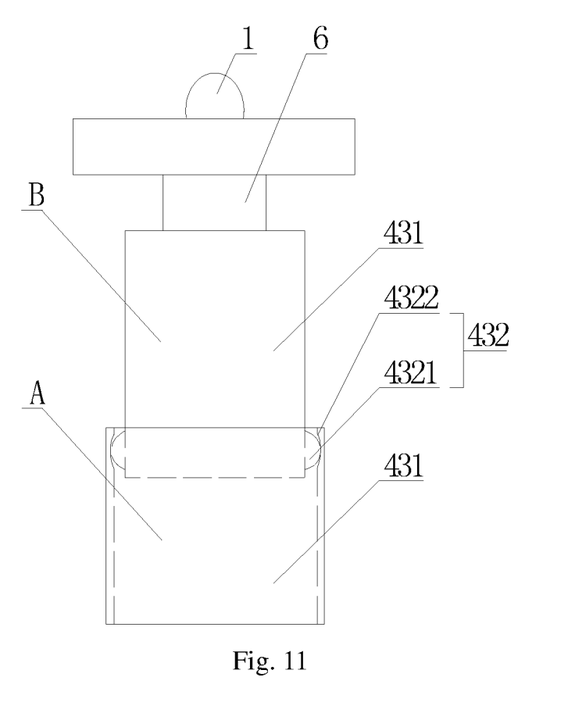
FIG. 11 is a schematic structural view of components of the telescopic rod in FIG. 10.

In an embodiment of the present disclosure, as shown in FIG. 11, the telescopic rod 43 comprises a plurality of sliding bushes 431 fitted over one another, and a stopper 432 is arranged between two adjacent sliding bushes 431 and comprises a stopping protrusion 4321 provided on an inner surface of one of the two adjacent sliding bushes 431 and a stopping groove 4322 provided on an outer surface of the other of the two adjacent sliding bushes.

In FIG. 11, for ease of description, two sliding bushes 431 fitted over each other are described in detail as an example. The same applies to a plurality of sliding bushes 431 fitted over one another.

When the two sliding bushes 431 fitted over each other are used, one of the sliding bushes 431 is used as the fixed end A of the telescopic rod 43 and is fixedly connected to the rear shell 32, while the other of the sliding bushes 431 that is used as the telescopic end B of the telescopic rod 43 may protrude out of the fixed end A and is fixed by the stopper 432 in a snap fit way when protruding to the fixing position. For example, as shown in FIG. 11, the stopping protrusion 4321 is disposed on the outer surface of the sliding bush 431 at the movable end, and the groove 4322 is disposed on the inner surface of the sliding bush 431 at the fixed end A. By the cooperation of the stopping protrusion 4321 and the stopping groove 4322, the telescopic rod 43 in the extended state is held in position, which is convenient for use by the user.

The cross-sectional shape of the sliding bush 431 is not specifically limited herein. In an embodiment of the present disclosure, the cross-section of the sliding bush 431 may be circular or oval, and the cross-sectional area of the sliding bush 431 decreases in an outside-to-inside sequence.

Figure 12:
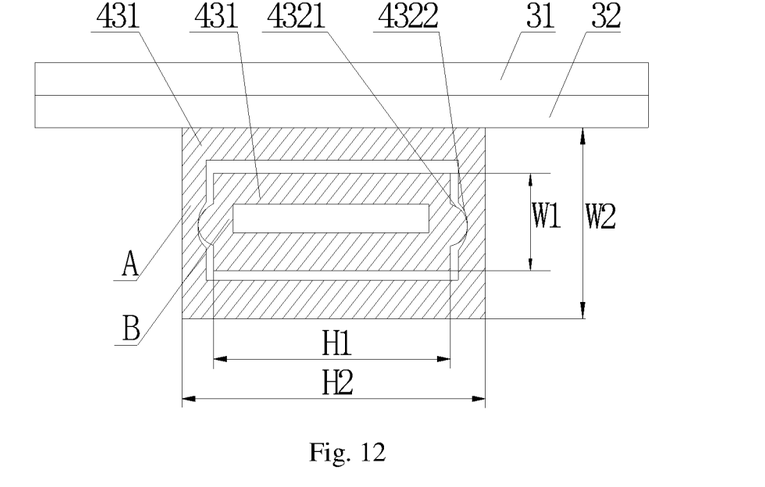
FIG. 12 is a top sectional view of the telescopic rod of FIG. 10 in a form of slide bushes.

In one embodiment of the present disclosure, as shown in FIG. 12, the sliding bush 431 has a rectangular cross section. The plurality of sliding bushes 431 are fitted over one another from the outside to the inside, and the length and the width of the rectangular cross-section of the sliding bush 431 are sequentially reduced from outside to inside (H2>H1; W2>W1). The telescopic rod 43 consisted of the sliding bushes 431 fitted over one another and disposed on the notebook computer needs to be affixed to the rear shell 32 as close as possible to avoid the protrusion height being too high, thus in an embodiment of the present disclosure, as shown in FIG. 12, the cross-section of the sliding bush 431 is in a rectangular shape.

Specifically, the fixed end A of the telescopic rod 43 is the end of a sliding bush 431 having larger length and width as shown in FIG. 12, so that when the telescopic rod 43 is pulled, the telescopic end B of the telescopic rod 43 is drawn from the fixed end A. Or, the fixed end A of the telescopic rod 43 is the end of a slide bush 431 having smaller length and width, so that when the telescopic rod 43 is retracted, the telescopic end B of the telescopic rod 43 receives the fixed end A therein, which can also be applied in the structure of the telescopic rod 43 in the present disclosure and is not specifically limited herein.

Meanwhile, as shown in FIG. 12, the stopping protrusion 4321 of the stopper 432 is disposed at the end of the sliding bush 431 with the length H1 of the telescopic rod 43, and the stopping groove 4322 is disposed at the end of the sliding bush 431 with the length H2 of the telescopic rod 43.

Or the stopping groove 4322 is disposed at the end of the sliding bush 431 with the length H1 of the telescopic rod 43 and the stopping projection 4321 is provided at the end of the sliding bush 431 with the length H2 of the telescopic rod 43, which can also be applied to the structure of stopper in the present disclosure and is not specifically limited herein.

In an embodiment of the present disclosure, in order to meet the user's requirement to multi-angle changes during the use of the camera 1, as shown in FIG. 11, the telescopic end of the telescopic rod 43 is connected to the camera 1 via a universal joint 6.

Therefore, when the telescopic rod 43 is in an extended state and the user is using the camera 1, the user may not only adjust the height of the camera 1 by lengthening and shortening the telescopic rod 43, but also adjust the left or right rotation angle as well as the pitch state of the camera by adjusting the universal joint 6 provided between the camera 1 and the telescopic rod 43, to ensure that the camera 1 may achieve omni-directional and multi-angle shooting when being used.

Figure 13:
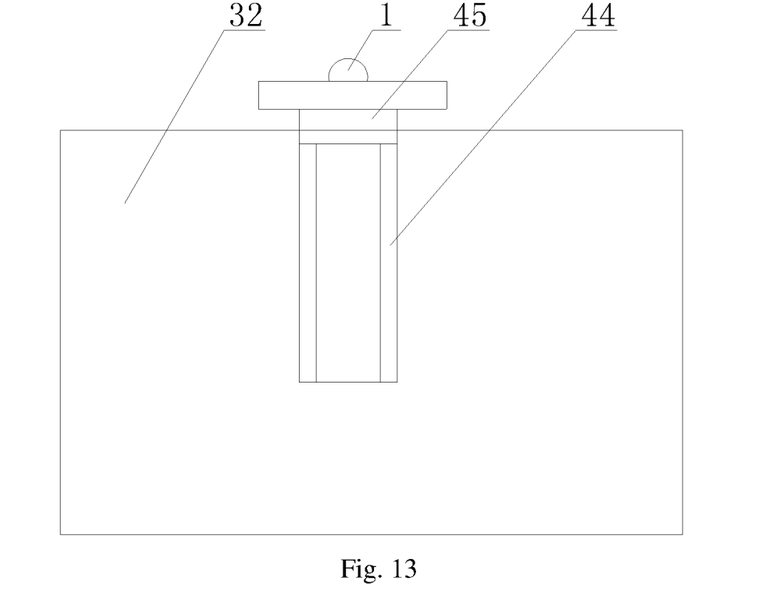
FIG. 13 is a schematic top view of a display device of the present disclosure in which connecting parts comprise a guide rail and a guide block.

In an embodiment of the present disclosure, a method for moving the camera 1 is also provided. As shown in FIG. 13, the connecting part 4 comprises a guide rail 44 and a guide block 45. The guide rail 44 is fitted with, and slidable relative to, the guide block 45. The guide rail 44 is disposed on the rear shell 32, and the camera 1 is disposed on the guide block 45; or the guide block 45 is disposed on the rear shell 32, and the camera 1 is disposed on the guide rail 44.

Therefore, the camera 1 can slide on the guide rail 44 through the guide block 45, so that the camera 1 is movable. When the camera 1 is not in use, the camera 1 may be retracted to the middle position of the rear shell 32 so that unconscious collision of the camera 1 may be prevented when the camera 1 is received on the edge of the rear shell 32.

As shown in FIG. 13, the guide rail 44 is disposed on the rear shell 32, and the camera 1 is disposed on the guide block 45; or the guide block 45 is disposed on the rear shell 32, and the camera 1 is disposed on the guide rail 44, both of the arrangements may achieve that the camera 1 protrudes beyond the periphery of the rear shell 32 when being used and retracts to the middle part of the rear shell 32 when not being in used. Therefore, the specific mounting positions of the guide rail 44 and the guide block 45 are not specifically limited in the present disclosure.

Figure 14:
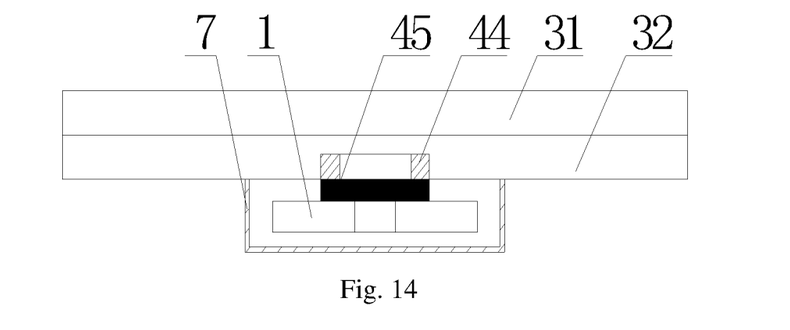
FIG. 14 is a top cross-sectional view of a display device of the present disclosure provided with a protective cover.

In an embodiment of the present disclosure, as shown in FIG. 14, a protective cover 7 is disposed on the rear shell 32, and the protective cover 7 covers the connecting part 4 and the camera 1.

Therefore, the protective cover 7 further protects the connecting part 3 and the camera 1 when the camera 1 is retracted, avoiding the damage to the camera 1 caused by the collision during using and carrying the notebook computer, and also reducing the dust entering the camera 1.

The above described contents are only exemplary embodiments of the present disclosure, however the protection scope of the present disclosure is not limited thereto. Modifications or replacements made by those skilled in the art within the technical scope disclosed in the present disclosure shall be included in the scope of the present disclosure. Therefore, the protection scope of the present disclosure is defined in the claims and their equivalents.

What is claimed is:

1. A display device comprising:
   a housing; and
   a camera movably connected to the housing through a connecting part, wherein the camera is movable between a position where the camera is affixed onto the housing and a position where the camera extends beyond a periphery of the housing,
   wherein the housing comprises a front bezel and a rear shell, and wherein the camera is disposed on a side of the rear shell facing away from the front bezel;
   wherein the connecting part comprises a telescopic rod, one fixed end of which is connected to the rear shell and a telescopic end of which is connected to the camera, and
   wherein the telescopic rod comprises a plurality of sliding bushes fitted over one another, and a stopper is arranged between two adjacent said sliding bushes and comprises a stopping protrusion provided on an inner surface of one of the two adjacent sliding bushes and a stopping groove provided on an outer surface of the other of the two adjacent sliding bushes.

2. The display device according to claim 1,
   wherein the camera is arranged at a middle position on an upper part of the rear shell.

3. The display device according to claim 1,
   wherein the connecting part comprises a hinge shaft and a hinge sleeve fitted with the hinge shaft; and
   wherein the hinge sleeve is disposed on the rear shell and the hinge shaft is disposed on the camera, or the hinge shaft is disposed on the rear shell and the hinge sleeve is disposed on the camera.

4. The display device according to claim 1,
   wherein a groove for receiving the camera is provided on the rear shell, and the camera is received in the groove in a condition that the camera is moved to the position where the camera is affixed onto the rear shell of the housing.

5. The display device according to claim 1,
   wherein cross sections of the plurality of sliding bushes fitted over one another are circular or oval or rectangular, and the plurality of the sliding bushes are fitted over one another in an outside to inside order.

6. The display device according to claim 1,
   wherein the telescopic end of the telescopic rod is connected with the camera through a universal joint.

7. The display device according to claim 1,
   wherein the connecting part comprises a guide rail and a guide block, the guide rail being fitted with, and slidable relative to, the guide block; and
   wherein either the guide rail is disposed on the rear shell with the camera disposed on the guide block, or the guide block is disposed on the rear shell with the camera disposed on the guide rail.

8. The display device according to claim 7,
   wherein a protective cover is disposed on the rear shell to cover the connecting part and the camera.

9. The display device according to claim 2,
   wherein the connecting part comprises a hinge shaft and a hinge sleeve fitted with the hinge shaft; and
   wherein the hinge sleeve is disposed on the rear shell and the hinge shaft is disposed on the camera, or the hinge shaft is disposed on the rear shell and the hinge sleeve is disposed on the camera.

10. The display device according to claim 2,
    wherein a groove for receiving the camera is provided on the rear shell, and the camera is received in the groove in a condition that the camera is moved to the position where the camera is affixed onto the rear shell of the housing.

11. The display device according to claim 1,
    wherein the telescopic end of the telescopic rod is connected with the camera through a universal joint.

12. The display device according to claim 5,
    wherein the telescopic end of the telescopic rod is connected with the camera through a universal joint.

13. The display device according to claim 2,
    wherein the connecting part comprises a guide rail and a guide block, the guide rail being fitted with, and slidable relative to, the guide block; and
    wherein either the guide rail is disposed on the rear shell with the camera disposed on the guide block, or the guide block is disposed on the rear shell with the camera disposed on the guide rail.

* * * * *